Figure 1:
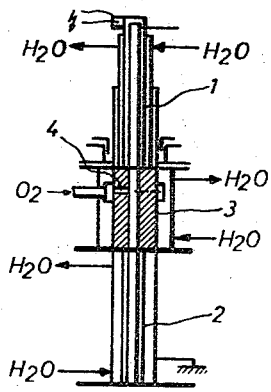

United States Patent

[11] 3,553,527

[72] Inventors  Walter Gutsche
               Krefeld;
               Hans Zirngibl, Duisburg, Germany
[21] Appl. No. 686,247
[22] Filed     Nov. 28, 1967
[45] Patented  Jan. 5, 1971
[73] Assignee  Farbenfabriken Bayer Aktiengesellschaft
               Leverkusen, Germany
               a corporation of Germany
[32] Priority  Dec. 1, 1966
[33]           Germany
[31]           F50816

[54] PROCESS AND APPARATUS FOR HEATING
     OXYGEN TO HIGH TEMPERATURE
     8 Claims, 7 Drawing Figs.
[52] U.S. Cl. ................................................. 315/111,
        23/202, 204/164, 204/323, 219/121, 252/503,
                              263/52, 313/161, 313/218
[51] Int. Cl. ................................................. H01j 7/24
[50] Field of Search ........................................ 23/202(V);
        252/503; 313/218; 315/111; 219/121(P); 263/52

[56]             References Cited
              UNITED STATES PATENTS
1,312,257   8/1919   King .......................... 252/503
2,468,173   4/1949   Cotton ........................ 313/218X
3,360,682  12/1967   Moore ......................... 315/111

Primary Examiner—Raymond F. Hossfeld
Attorney—Burgess, Dinklage and Sprung

ABSTRACT: Electrode for producing electric arcs for heating oxygen-containing gas, composed of an electrode material such as a noble metal (e.g. silver, gold, etc.), a noble metal alloy or a composite substance constituting such noble metal or alloy substantially uniformly distributed in compact carbon or graphite (the latter being formed e.g. by impregnation of the carbon or graphite with the liquid metal or alloy or by compression-molding and sintering, e.g. below 1000° C., of a powder mixture of the constituents) and e.g. forming a protective cohesive layer of metal over the surface of such carbon or graphite, said electrode material having a thermal conductivity, as measured at 20° C., which is greater than 0.33 cal/cm.s.° C. and the corresponding metal oxide thereof being unstable at a temperature above about 500° C; and process for heating oxygen or oxygen/inert gas mixture to above 1000° K. (e.g. 1000—4000° K) by means of an electric arc discharge produced by electrodes composed of said electrode material situated in the oxygen or oxygen/inert gas mixture to be heated, optionally with preheating of the gas medium to at most about 800° C., preferably with cooling of the electrodes (e.g. by water at 5—25°C.), using direct or alternating or three-phase current, and preferably with adjustment of the arc discharge resistance in dependence upon the flow velocity rate of the gas medium or by applying a magnetic field whereby to cause rapid movement of the focal point of the arc over the electrodes to minimize electrode wear.

INVENTORS:
WALTER GUTSCHE, HANS ZIRNGIBL.

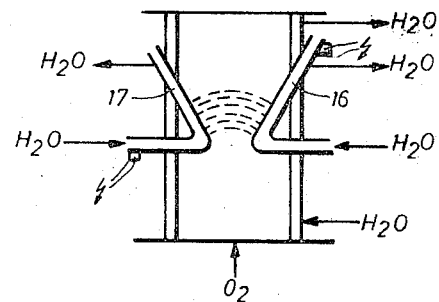
FIG. 4
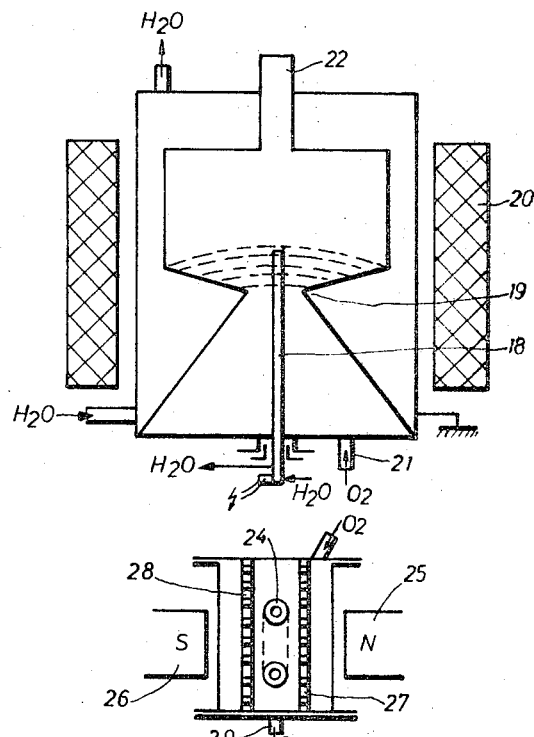
FIG. 5
FIG. 6
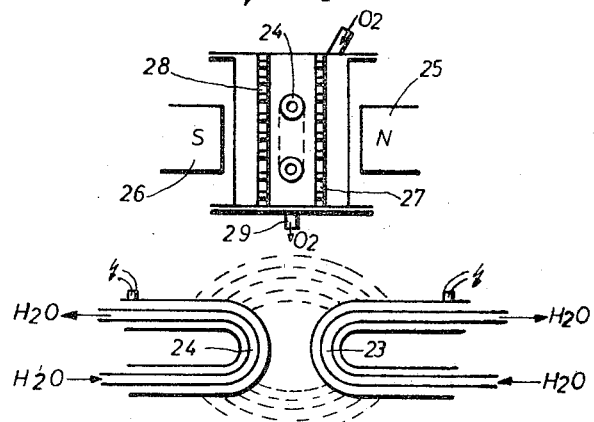
FIG. 7

PROCESS AND APPARATUS FOR HEATING OXYGEN TO HIGH TEMPERATURE

PROCESS AND APPARATUS FOR HEATING OXYGEN TO HIGH TEMPERATURE

This invention relates to a process and an apparatus for heating oxygen to high temperatures.

In some inorganic gas-phase reactions which have long been of industrial interest such as, in particular, the reaction of readily volatile halides with oxygen to from the corresponding finely divided oxides suitable for use as pigments or fillers, one or both of the reactants has to be continuously preheated to a temperature above 1000° K. to enable the reaction to proceed under control due to the fact that they are inhibited to a considerable extent.

Oxygen or oxygen/inert gas mixtures rich in oxygen of the kind used for the above-mentioned reactions can only be heated to temperatures of at the most 800° C. in heat exchangers made from metals. Ceramic heat exchangers are prone to breakage, difficult to seal and not very efficient. The method often described, namely to heat oxygen by mixing it with the hot gaseous end products from a highly exothermic chemical reaction, is often unworkable due to the dilution and possible contamination involved.

More recently, it was proposed to use for heating an electrical discharge which takes place in the gases to be heated themselves. The electrical discharge has also been used to produce an inert gas plasma which, by admixture, transfers its energy to the gas to be heated. By an inert gas plasma, we mean superheated nitrogen, argon, helium neon and the like.

Since extremely high energy densities and hence high temperatures can be reached in electrical discharges, the dimensions of the apparatus used are small, even for large throughputs. High-intensity plasma burners and induction-type plasma burners are preferably used to heat the gases. In the high-intensity plasma burner, the gas flows axially or helically through an arc struck between a rod-shaped tungsten cathode and a copper nozzle of cylindrical shape arranged coaxially therewith. Both the electrodes are water-cooled. In the induction-type plasma burner, the gas flows in a helix through a quartz tube surrounded by a cooled copper coil. High-frequency alternating currents flowing through the coil produce a field which in turn produces vigorous movement among the particles in the preionized gas, thus heating it. A droplet-form plasma is formed inside the coil. Unfortunately, both types of burner are attended by serious disadvantages which prevent them from being used on a large scale:

1. Due in particular to the high energy losses involved in generating the high frequency, the high frequency plasma burner has a lower efficiency level, normally below 50 percent. In addition, the high-frequency generators are expensive and limited in their output.
2. The high-intensity plasma burner also suffers from high energy losses, usually amounting to between 40 percent and 60 percent, due to the intensive cooling of the electrodes.

Even more of a disadvantage, however, is the limited service life of the electrodes and in particular of the anode in high-intensity plasma burners, which, in cases where polyatomic gases are used, often only amounts to a few hours.

In addition, electrode burnup in arc burners contaminates the end product in the production of white pigments such as titanium dioxide. The metal vapors or metal oxides entrained by the plasma jet discolor the pigment. Accordingly, it has been proposed to use as electrode materials only those metals and compounds which form nondiscoloring oxides such as Al, Ti, Zr, SiC and carbon. Unfortunately, electrode burnup is not prevented by measures such as these. The electrodes have to be replaced after a short time or at least readjusted to maintain a constant distance between the electrodes. In the latter case, however, special packings are necessary between the movable electrodes and the insulators. Moreover the cooling involves considerable difficulties as the burnup prevents the cooling of the electrodes from inside or makes it at least hazardous.

The proposal to lay a layer of protective gas between the electrode and the reactive gas also does not provide a substantial increase in the service life of the electrodes because the turbulence prevailing in the burner always destroys this layer of inert gas.

The present invention relates to the continuous electrical heating of oxygen or oxygen/inert gas mixtures to temperatures between 1000° K. and 4000° K., for example, by means of an arc or a high-voltage discharge, using a special electrode material. The electrodes used in accordance with the invention have a considerably lengthened service life.

According to the invention, this electrode material has to satisfy two requirements. Firstly, it should show a thermal conductivity of 0.33 cal./cm/s/° C. and above, as measured at 20° C., and, secondly, the metal oxides formed from this material should not be stable at temperatures above 500° C. Suitable electrode materials include, in particular, the noble metals silver and gold, the alloys between silver and gold, whereby alloys containing 18 to 93 weight percent of gold are not suitable, and composite materials of these metals or metal alloys with carbon or graphite containing between about 10 to 50 weight percent of said metals or alloys. In the context of this invention, a composite material is a compact material of carbon or graphite in which the metal is uniformly distributed in a more or less high concentration.

The composite material can be prepared by two methods, a sintering and an impregnating process. In the sintering process the powder form constituents are homogeneously mixed and then compression moulded. Finally, the moulded articles are sintered at temperatures below the melting points of the metal that is below 1060° (mp of Au) or below 960° (mp of Ag). The aforesaid process is well-known in the art and described e.g. in "Elektrotechnische Zeitschrift" 4 (1952 S. 279—282).

In the impregnation process a carbon or graphite body having a porosity of about 5 to 20 percent (the particles of said bodies having a particle size of about 40 to 1000 micron) are heated in the presence of the aforesaid metals or alloys to temperatures of about 100° C. above the melting points of said metals or alloys. The metals or alloys are present in an amount sufficient to yield the composite material comprising said carbon or graphite material containing 10 to 50 percent by weight of said metals or alloys in finely divided form. The impregnation is performed in vacuum-tight vessels. After evacuating said vessels to a pressure of about 0.1 to 1 torr a superatmospheric pressure is applied of up to 20 atu by introducing an inert gas such as Ar, $N_2$, $H_2$, CO, He and the like. This method has been described e.g. by Legler et al. in "Chemische Technik" 13 (1961), S. 641. The composite materials as described above are available on the market. They are used as carbon brushes in the electro technique, e.g. in current collectors of tramps, electric locomotives etc.

It has been found that, by virtue of the instability of their oxides, the aforementioned metals are not affected by the extremely hot oxygen either. The erosion produced at the focal spot by evaporation or sputtering is very slight, particularly in the case of the composite materials. Although the carbon or graphite may be superficially oxidized, the embedded metal particles melt due to the high temperature at the focal spot and, in doing so, form a cohesive noble metal layer over the surface, which protects the carbon matrix against further attack. In addition, sputtering of the fused metal is greatly reduced by the capillary forces.

Among the many types of arc, it is preferred to use the so-called vortex-stabilized arc whose resistance is kept at a level between 1 and 50 ohms by tangentially blowing the gas to be heated around it at a velocity of 20 to 300 m/sec., and whose operating voltage is between about 500 and 6000 V., preferably above 1000 v., and with a current of about 20 to 500 A. The advantage of this arc lies in its better efficiency when the gases are heated, normally amounting to between 75 percent and 90 percent, and in the relatively low current density at the surface of the electrodes, thus reducing their thermal stressing.

By tangentially blowing the gases to be heated onto the arc, the focal spot of the arc can be made to move quickly on the electrodes that is with a frequency of about 6000 to 360,000 r.p.m. (revolutions per minute). The service life of the electrodes can also be improved by this measure.

It is also possible by influencing the arc with a magnetic field produced by a coil situated outside the arc to increase the resistance of the arc and to make the focal spot of the arc move about rapidly on the electrodes that is with a frequency of about 60,000 to 3,600,000 r.p.m.

Accordingly, this measure, too, is preferably applied in conjunction with the use of the electrode material according to the invention.

In addition to being tangentially supplied to the arc, the gas to be heated may also be axially or radially introduced.

Finally, the process according to the invention may also be carried out with high-intensity arcs whose resistance has a value of between about $5 \times 10^{-4}$ and 1 ohm, whose current intensity is normally in the range of about 200 to 30,000 amps and whose voltage is in the range of about 15 to 200 volts. In this case, the focal point of the arc has to move about quickly on the electrodes under the influence of strong magnetic fields in excess of 1000 Gauss, as measured in the center of the arc in order to prevent the electrodes from being pierced.

Hexagonal boron nitride (BN), silicon nitride ($Si_3N_4$), quartz ware and quartz glass have all proved to be suitable materials for the insulators. These compounds retain their outstanding insulating properties even at elevated temperatures.

The electrodes are with advantage externally cooled by water, for which purpose a closed circuit of desalted water free of suspended matter passed through a heater exchanger may be used to prevent deposits of boiler scale in the cooling channels.

It is readily possibly by measuring the inlet and outlet temperature and the throughput of coolant (water) to calculate the energy losses of the burner from which the efficiency of the burner can be determined, providing the input of energy is known.

The rapid dissipation of heat from the focal spot of the arc is essential to the process according to the invention. The water used for cooling should flow through the cooling channels or the cooling jacket of the electrodes at a velocity of between 2 and 40 m/sec.

The high thermal conductivity of the electrode material is an equally important factor. In addition to the conduction of heat perpendicularly to the surface of the electrode, the high concentration of energy at the focal point also necessitates the dissipation of heat parallel to the surface of the electrode towards the cooling elements which, by virtue of their temperature and thermal capacity, are able spontaneously to absorb large quantities of energy.

The already mentioned rapid movement of the focal spot of the arc on the electrodes under the influence of magnetic fields, or under the flow of the working gas, is also of considerable influence upon the service life of the electrodes. The magnetic fields are generated by water-cooled coils through which direct current flows. Field intensities of around 300 to 5000 Gauss have proved to be suitable for influencing arcs with a current intensity of about 20 to 500 amps, a voltage of about 500 to 6000 volts, and a resistance of about 1 to 50 ohms.

In cases where one or both of the electrodes is, or are, in the form of hollow electrodes, it can be of advantage to protect the surface of the electrodes against damage by the oxygen by blowing in an inert gas in small quantities. Due to the high degree of turbulence, this protection is often only temporary especially since the oxygen cannot be diluted with excessively large quantities of the inert gas, usually nitrogen and argon. In addition, the focal point of the arc can be continuously displaced by the "pulsating" injection of an inert gas.

In order to use the relatively expensive electrical energy for the last heating stage only, it can be of advantage to preheat the oxygen-containing gas mixture in gas- or oil- heated heat-exchangers or heaters up to temperatures which metals are able to withstand, for example in the range of from 600° C. to 800° C. The gas mixture thus preheated is then further heated to the required temperature in the arc burner.

The process according to the invention may be carried out, for example, with the apparatus known per se shown in FIGS. 1 to 7 of the drawings although any other apparatus with which the essential conditions referred to above are satisfied may also be used. The electrodes are preferably water-cooled.

FIG. 1 shows an arc burner comprising two hollow electrodes 1 and 2 which are arranged one above the other on a common axis and which are electrically separated by an insulator 3. The insulator 3 is provided with tangential bores 4 through which the gas to be heated e.g. $O_2$ is introduced into the cylindrical interior. The arc, which is struck by short circuiting the electrodes with an auxiliary electrode or metal wire, burns mainly in the longitudinal axis of the burner. Inside each of the two hollow electrodes, the arc bends towards the surface of the electrodes, terminating in a focal spot which moves in circles across the surface of the electrode. The hot gas leaves the burner at the lower open end of the electrode 2. Each of the two electrodes may be surrounded concentrically by a coil producing a magnetic field extending in the axial direction.

Figure 2:
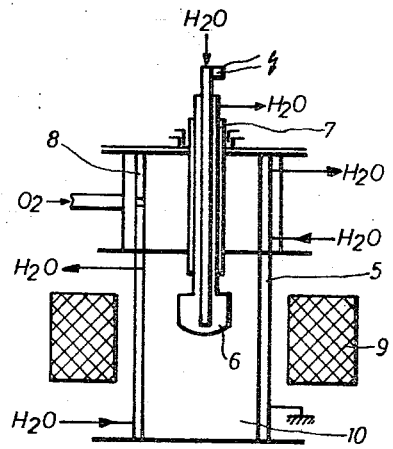

FIG. 2 shows a burner with two concentrically arranged electrodes, a cylindrical hollow electrode 5 and a central electrode 6 which is electrically insulated from the housing by the insulator 7. The burner head 8 incorporates one or more inlet openings for the gas to be heated. The arc burns between the inner wall of the electrode 5 and the outer wall of the electrode 6. The magnetic field produced by the coil 9, extending along the axis of the burner, makes the arc rotate between the surfaces of the electrode like the spoke of a turning wheel. The plane it describes in rotating is perpendicular to the axis of the burner. The heated gas leaves the burner at 10.

Figure 3:
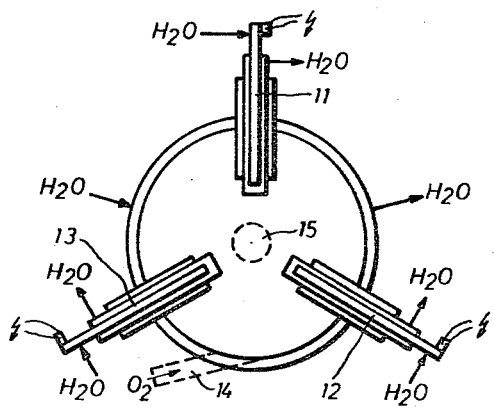

FIG. 3 shows a burner suitable for use with three-phase current. It is equipped with three electrodes 11, 12 and 13. The gas to be heated enters the cylindrical burner chamber tangentially at a point 14 and leaves it at a point 15 perpendicularly to the plane of the paper. The arc burns between two electrodes, leaping in a circle from electrode to electrode according to the phase position of the current.

FIG. 4 shows an arrangement comprising electrodes 16 and 17 projecting at an angle into a cylindrical chamber. The gas flows in at the lower end and, in doing so, blows the arc upwards causing it to spread out according to the dash lines.

FIG. 5 resembles FIG. 2 in the path followed by the arc and the field lines. The arc initially burns at the point where the gap between the central electrode 18 and the jacket electrode 19 which surrounds the electrode 18, is narrowest. The magnetic field generated by the coil 20 causes the arc to rotate about the electrode 18 in a plane perpendicular to the axis of the burner. The arc is pushed into the conical part of the electrode 19 by the inflowing gas, admitted into the burner at a point 21, and thereby lengthened according to the dash lines. The hot gas flows out of the burner at a point 22.

FIGS. 6 and 7 show a conventional Birkeland-Eyde furnace with two electrodes 23 and 24 consisting of two U-tubes. The poles of an electromagnet 25 and 26 are arranged perpendicularly of the electrodes. An alternating current arc struck between both the electrodes is spread out by the magnetic field into a flat disc, as shown by the dash lines in FIG. 7. The gas flowing in from the perforated plates 27 and 28 is blown vertically through this disc, being removed at a point 29. The inlets and outlets for the coolant (water) and the paths it follows are shown in all the FIGS.

The invention is illustrated by the following Examples:

EXAMPLE 1

30 Nm3/hour of oxygen having a temperature of 20° C. were blown into a burner of the kind shown in FIG. 1 fitted with electrodes of metallic silver, the anode had a length of 300 mm., the cathode a length of 220 mm., the thickness of the walls was 2 mm. When the burner was operated at 30 amps DC a voltage of 1200 v. was obtained. The heat dissipated in the cooling water amounted to 7,520 Kcal/h. Accordingly, the burner had an efficiency of 75.7 percent. The issuing gas had an average enthalpy of 0.548 Kcal/g corresponding to an average temperature of 2080° K. The burner was operated for 200 hours under the same conditions. At the end of this period, the electrodes were examined. Both electrodes showed a limited degree of roughening over an approximately 30 mm.-long zone on the inner surface of the electrode. The remaining parts of the inner surfaces were smooth. None of the electrodes showed any signs of pitting, nor did they have any pores.

EXAMPLE 2

The shown in FIG. 2 was equipped with electrodes (length of cathode 55 mm., length of anode 120 mm., wall thickness 9—10 mm., distance between the electrodes 30 mm) which had been produced from a mixture of 20 percent by weight of silver and 80 percent of graphite by compression moulding and subsequent sintering in an inert atmosphere. 50 Nm³/hour of oxygen at room temperature were blown in through the burner head 8. A magnetic field with an intensity of 2000 Gauss along the axis of the burner was generated by the coil 9. An arc voltage of 1320 v. resulted at a current intensity of 40 amps. The efficiency of the burner amounted to 77.2 percent. The issuing gas had an enthalpy of 0.49 Kcal/g., corresponding to 1930° K. The test was carried out over a period of 96 hours. Over a 25 mm-long zone, the electrodes had a shallow flat depressions 0.4 mm deep with completely smooth metallike surfaces.

EXAMPLE 3

50 Nm³/hour of a gas mixture of 20 percent by volume of nitrogen and 80 percent by volume of oxygen with a temperature of 20° C. was fed to a burner of the kind shown in FIG. 3 whose outer electrode jacket had been produced from metallic silver.

The electrodes 11, 12 and 13 (length 250 mm., wall thickness 2 mm) were connected to the three phases of a three-phase transformer with a stray field. The term stray field being used herein with reference to H. Freeman "Elektrochemisches Englisch" 5. Ed. 1956, Essen Girardet.

A voltage of 1040 v. was obtained at a current intensity of 150 amps. The efficiency of the burner was calculated as 69.5 percent. The average enthalpy of the issuing gas mixture amounted to 1.33 Kcal/g. After a test run lasting 120 hours, the pit marks in the surfaces of the electrodes had a maximum depth of 0.3 mm.

EXAMPLE 4

20 Nm³ of oxygen at room temperature were blown hourly through an arrangement of the kind shown in FIG. 4 whose electrodes (diameter 8 mm., wall thickness 1.5 mm.), within the cylindrical part consisted of metallic gold, whilst the cylindrical part was made of quartz.

The arc was run on an alternating current of 1800 V./7.05 amps. The oxygen absorbed 0.302 Kcal/g of energy at an efficiency level of 79.0 percent. This corresponds to a temperature of approximately 800°C.

The electrodes were examined after a test run lasting 110 hours. The electrodes were unmarked except for a few flat pit marks with a maximum depth of 0.2 mm. on the inwardly facing surfaces of the electrodes.

EXAMPLE 5

A burner of the kind shown in FIG. 5 was used for this test. Its jacket electrode 19 had been made from an Ag/ graphite composite material containing 28 percent of Ag (wall thickness 10 mm., diameter at the narrowest gap 20 mm.). The central electrode 18 consisted of metallic silver (wall thickness 2 mm., diameter 12 mm.). The burner was operated on direct current (50 amps), being supplied with 62 Nm³ of a mixture of 75 percent by volume of oxygen and 25 percent by volume of nitrogen having a temperature of 20° C. A field with an intensity of 1600 Gauss was adjusted in the axis of the burner by the magnetic coil 20. A voltage of 1750 v. resulted. The gas absorbed 0.65Kcal/g of energy for a measured efficiency of 74.2 percent.

The test run lasted for more than 200 hours. At the end of this period, the jacket electrode was as smooth as metal in appearance over the upper face of the cone and at the constriction. The diameter of the constriction had been widened by 0.5 mm. The outer surface of the central electrode had a few helical notches with a maximum depth of 0.3 mm.

EXAMPLE 6

45 Nm³/h of a mixture of 50 percent by volume of oxygen and 50 percent by volume of nitrogen with a temperature of 20° C. was introduced into an apparatus of the kind shown in FIG. 6 in a test lasting 96 hours. The arc was operated with 2100 v. and 22.4 amps. alternating current at a magnetic field intensity of 1400 Gauss between the poles of the electromagnets. The two electrodes of the burner had been made from silver tubes (wall thickness 3 mm., diameter 30 mm.). A total of 8900 Kcal/h of energy was dissipated in the cooling water and through radiation. Accordingly, the burner was 78 percent efficient. The gas absorbed 0.523 Kcal/g of energy.

The electrodes suffered no real damage, apart from a few craterlike pit marks with a maximum depth of 0.35 mm.

EXAMPLE 7

85 Nm³ /h of oxygen at room temperature were passed through the burner shown in FIG. 2 whose electrode gap was narrower than that used for Example 2. Both electrodes consisted of silver (wall thickness 2 mm., distance between electrodes 15 mm.). The arc between the electrodes had a current intensity of 850 A and a voltage of 280 v. for a magnetic field intensity of 2400 Gauss. The measured level of efficiency amounted to 66 percent, so that the gas absorbed 1.11 Kcal/g of energy, corresponding to a temperature of 3100° K. After a test run lasting 50 hours, the electrodes were unchanged except for some roughening over a 30 mm. wide zone of their surface.

Thus, by using the instant electrodes for electric arc discharge heating of oxygen-containing gas such as oxygen or mixtures of oxygen with inert gas e.g. nitrogen, argon, etc., to a temperature of e.g. 1000—4000° K, such oxygen-containing gas may be reacted in turn with titanium tetrachloride, or the like, to produce finely divided titanium dioxide for pigment, filler, etc. purposes in the conventional way.

We claim:

1. In the process of heating a gas medium selected from the group consisting of oxygen and oxygen/inert gas mixture to a temperature above 1000° K. by means of an electric arc discharge which is produced between cooled electrodes in the medium being heated, the improvement which comprises carrying out such heating while using as electrode material for such electrodes a composite substance constituting a member selected from the group consisting of silver, gold, and an alloy of silver and gold substantially uniformly distributed in a compact member selected from the group consisting of carbon and graphite and forming a protective cohesive surface layer of metal over the surface of such compact member, said electrode material having a thermal conductivity as measured at 20° C. which is greater than 0.33 cal/cm.s.° C. and the corresponding metal oxide thereof being unstable at a temperature above about 500° C.

2. Improvement according to claim 1 where said temperature is between about 1000—4000° K.

3. Improvement according to claim 1 wherein the arc discharge used is adjusted to a resistance of between about 1-—50 ohms at a voltage of about 500 to 6000 volts by introducing the medium to be heated tangentially into the arc discharge chamber at a velocity of between about 20—300 m/sec., related to NTP, whereby to cause rapid movement of the focal point of the arc over the electrodes to minimize electrode wear with frequencies between 6000 and 360,000 revolutions per minute.

4. Improvement according to claim 1 wherein the arc discharge used is adjusted to a resistance of between about 1-—50 ohms at a voltage a of about 500 to 6000 volts by applying thereto a magnetic field having a field intensity of from 300 to 5000 Gauss, as measured at the center of the arc, whereby to cause rapid movement of the focal point of the arc over the electrodes to minimize electrode wear with frequencies of between 60,000 and 3,600,000 revolutions per minute.

5. Improvement according to claim 1 wherein the arc discharge has an electrical resistance of between $5 \times 10^{-4}$ and 1 ohm and a current intensity from 200 amps to $3 \times 10^{+4}$ amps, and wherein a magnetic field having a field intensity from 1000 to 5000 Gauss, as measured at the center of the arc, is applied thereto, whereby to cause rapid movement of the focal point of the arc over the electrodes to minimize electrode wear with frequencies of between 60,000 and 3,600,000 revolutions per minute.

6. In the process of heating a gas medium selected from the group consisting of oxygen and oxygen/inert mixture to a temperature above 1000° K. by means of an electric arc discharge which is produced between cooled electrodes in the medium being heated, the improvement which comprises carrying out such heating while using as electrode material for such electrodes a composite substance constituting silver substantially uniformly distributed in a compact member selected from the group consisting of carbon and graphite and forming a protective cohesive surface layer of metal over the surface of such compact member, said electrode material having a thermal conductivity as measured at 20° C. which is greater than 0.33 cal/cm.s.° C. and the corresponding metal oxide thereof being unstable at a temperature above about 500° C.

7. In the process according to claim 1 of heating a gas medium selected from the group consisting of oxygen and oxygen/inert mixture to a temperature above 1000° K. by means of an electric arc discharge which is produced between cooled electrodes in the medium being heated, the improvement which comprises carrying out such heating while using as electrode material for such electrodes a composite substance constituting gold substantially uniformly distributed in a compact member selected from the group consisting of carbon and graphite and forming a protective cohesive surface layer of metal over the surface of such compact member, said electrode material having a thermal conductivity as measured at 20° C. which is greater than 0.33 cal/cm.s.° C. and the corresponding metal oxide thereof being unstable at a temperature above about 500° C.

8. In the process according to claim 1 of heating a gas medium selected from the group consisting of oxygen and oxygen/inert mixture to a temperature above 1000° K. by means of an electric arc discharge which is produced between cooled electrodes in the medium being heated, the improvement which comprises carrying out such heating while using as electrode material for such electrodes a composite substance constituting an alloy of silver and gold substantially uniformly distributed in a compact member selected from the group consisting of carbon and graphite and forming a protective cohesive surface layer of metal over the surface of such compact member, said electrode material having a thermal conductivity as measured at 20° C. which is greater than 0.33 cal/cm.s.° C. and the corresponding metal oxide thereof being unstable at a temperature above about 500° C.